United States Patent [19]

Durance et al.

[11] 4,167,656

[45] Sep. 11, 1979

[54] JUNCTOR CHECKING SYSTEM

[75] Inventors: Robert A. Durance, Richmond; John A. Cribb, Ottawa, both of Canada

[73] Assignee: Mitel Corporation, Canada

[21] Appl. No.: 933,540

[22] Filed: Aug. 14, 1978

[30] Foreign Application Priority Data

Feb. 28, 1978 [CA] Canada .................................. 297884

[51] Int. Cl.² .......................... H04M 3/24; H04Q 1/24
[52] U.S. Cl. .......................... 179/175.2 R; 179/18 AB
[58] Field of Search ................. 179/175.2 R, 175.2 C, 179/175.21, 18 AB, 18 FA, 18 G, 18 GF, 18 HA, 175.35, 175.25; 340/147 SC

[56] References Cited

U.S. PATENT DOCUMENTS 3,941,949  3/1976  Miller et al. .................. 179/175.2 R

FOREIGN PATENT DOCUMENTS 2652243  5/1978  Fed. Rep. of Germany .... 179/175.2 R

*Primary Examiner*—Thomas A. Robinson
*Attorney, Agent, or Firm*—Craig and Antonelli

[57] ABSTRACT

A junctor checking system for an electronic PABX which checks the potential of the junctor under control of a microprocessor. A voltage level sensing circuit is connected to the junctor to be checked; a resistor connects the input of the voltage level sensing circuit to a voltage source. In the event the impedance of the junctor to ground is not as expected with respect to at least one threshold, the junctor is considered faulty and a different idle junctor is selected.

8 Claims, 1 Drawing Figure

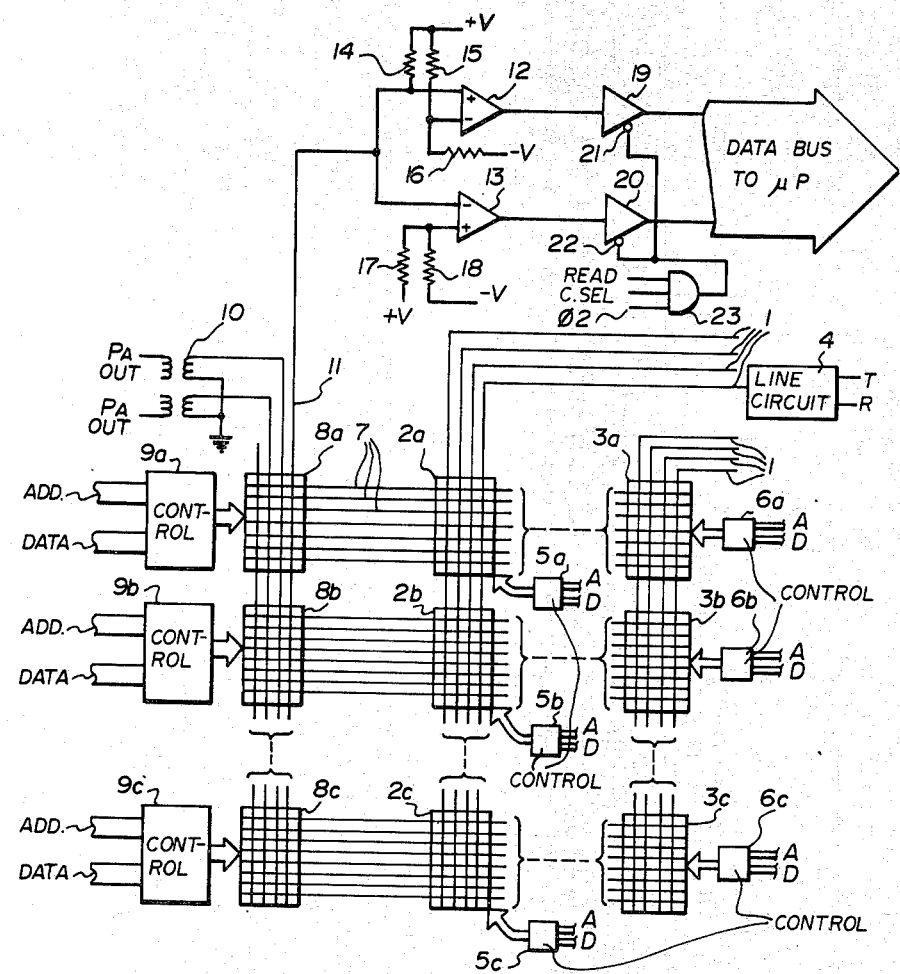

JUNCTOR CHECKING SYSTEM

This invention relates to a system for checking junctors in telephone switching apparatus such as PABXs.

Telephone switching apparatus such as PABXs normally interconnect incoming and outgoing line circuits and trunk circuits through junctors. The junctors interconnect the line and trunk circuits through crosspoint matrices which, in the past, had generally been mechanical spring or reed types.

However, certain types of electronic switching apparatus, particularly the kind which are microprocessor controlled, use CMOS crosspoint switches. Faults can sometimes occur in the CMOS switches, which faults cause connection of the talking path to a source of negative or positive potential.

Faults can also be encountered in the interfacing circuitry to line or trunk circuits which are connected to the crosspoints. Since the interfacing circuitry normally exhibits low impedance (typically 600 ohms) to ground, connection thereof to the talking path should bring the talking path close to DC ground potential. In the event of a fault in the interfacing circuitry, the low impedance paths may not exist, and the resulting talking path voltage may deviate substantially from the required DC voltage level.

The aforenoted DC voltage levels can all be detected on the junctor at appropriate times. The present invention is directed to a system for checking the voltage level on selected junctors to determine whether or not the aforenoted, or other faults exist on the junctor.

The invention in general is a junctor checking system comprising a first junctor for connection to a line circuit which has a low impedance to a common potential, a voltage level sensing circuit, means for connecting the voltage level sensing circuit to the junctor, a resistor connecting the input of the voltage level sensing circuit to a voltage source, and means for connecting the voltage level sensing circuit to a further idle junctor in the event the voltage level sensed by the sensing circuit after connection to the junctor is closer to common potential than to the potential level of the voltage source. It is also preferred that the system further comprises means for connecting the voltage level sensing circuit to another junctor in the event the voltage level sensed by the sensing circuit after connection of the junctor to the line circuit is higher or lower than a predetermined range which includes common potential.

It should be noted that the connection of the voltage level sensing circuit to another junctor designates rejection of the first by the system. Accordingly the means for connecting the voltage level sensing circuit includes means which is operated as a result of the voltage level sensing circuit sensing a voltage which is out of the required range. Connection of the voltage level sensing circuit to a further idle junctor therefore means rejection of the junctor for use in the talking path and selection of another, the voltage level which is thereupon also measured.

A better understanding of the invention will be obtained by reference to the detailed description below, and to the single FIGURE, which is a schematic diagram of the inventive system.

The single FIGURE shows the inventive circuit in the environment of the apparatus with which it is used. Assuming that the invention is used in a microprocessor controlled PABX, the inputs to the system shown are unbalanced lines 1 which are connected to the columns of crosspoint matrices 2a, 2b, and 2c, 3a, 3b and 3c, etc. A representative two way balanced to unbalanced line circuit 4 is shown to which balanced tip and ring leads T and R are connected. It should be noted that the individual lines are connected to line circuits of the kind typically described in Canadian patent application Ser. No. 296,137 dated Feb. 1, 1978 entitled TELEPHONE LINE CIRCUIT invented by Michael C. J. Cowpland et al or to the trunk circuit typically described in Canadian application Ser. No. 297,883 filed Feb. 28, 1978 entitled TRANSFORMERLESS TRUNK CIRCUIT, invented by Patrick Beirne et al, or other similar circuits.

The PABX is also typically fabricated of crosspoint matrices having 8 rows and 4 columns which are similar to crosspoint matrices 3a, 3b and 3c, 2a, 2b and 2c etc. A CMOS switch (not shown) interconnects each of the row and column conductors at each of the crosspoints of all of the matrices. In the FIGURE shown it is contemplated that there is an array made up of four 3a, 3b and 3c or 2a, 2b and 2c crosspoint matrices down by as many 3a, 3b and 3c 2a, 2b and 2c matrices across as is needed to provide the required number of lines or trunks. As is shown, each of the row conductors is connected across to corresponding conductors of each of the 3a, 3b and 3c 2a, 2b and 2c matrices, and each of the column conductors is connected to corresponding conductors of each of the 4 matrices of the column. As a result there are column conductors for connection to line or trunk circuits, and matrices 3a, 3b and 3c, 2a, 2b and 2c row conductors which are used for interconnection between column conductors leading to the line or trunk circuits.

Each of the matrices 2a, 2b and 2c, 3a, 3b and 3c, etc. is under control of a crosspoint control circuit 5a, 5b and 5c, 6a, 6b and 6c, etc. Each crosspoint control circuit has an address input A and a data bus input D, which address and data bus inputs are connected to the corresponding address and data buses of a microprocessor (not shown). Upon designation of a particular crosspoint with signals on the address and data buses, an enable signal is applied to the CMOS switch at a particular addressed crosspoint, closing a talking path for either voice or data between a column and a row conductor. The closure of two of such crosspoints provides a talking or data path between a pair of line circuits, line and trunk circuits, etc.

The row conductive paths are designated the junctors 7 previously referred to, and the present invention contemplates detecting the voltage thereon to determine whether a fault condition exists.

The junctors 7 are extended to another crosspoint matrix 8a, 8b and 8c, etc., which is similar to crosspoint matrices 2a, 2b and 2c, 3a, 3b and 3c, etc. The crosspoint matrix 8a, 8b and 8c is controlled, in a similar manner as matrices 2a, 2b and 2c and 3a, 3b and 3c, by control circuits 9a, 9b and 9c, which are similar to control circuits 5a, 5b, 5c, 6a, 6b, 6c, etc.

The column conductors of crosspoint matrix 8a, 8b and 8c are connected to various service circuits of the PBX. For instance, the two centre column conductors in the FIGURE are connected to transformers 10, which are connected to public address outputs PA OUT. Accordingly the PABX, under control of the control circuitry connected to the microprocessor, can close a pair of crosspoints, connecting a line circuit from a telephone set to a public address output via, for instance, crosspoint matrices 2a, 2b and 2c and 8a, 8b and 8c, allowing a subscriber to make a public anouncement.

The inventive circuit is connected to one of the column conductors 11 of crosspoint matrix 8a, 8b and 8c. This column conductor is connected through to the corresponding column conductors of the column of the individual matrices as shown.

A voltage level sensing circuit is connected to column conductor 11. The circuit is comprised of a pair of differential amplifiers 12 and 13. The non-inverting input of amplifier 12 is connected to the inverting input of amplifier 13 and to column conductor 11. Column 11 is also connected through resistor 14 to a source of positive potential +V.

The inverting input of differential amplifier 12 is connected to the tap of a voltage divider comprising resistors 15 and 16, which voltage divider is connected between the source of positive potential and source of negative potential −V.

Similarly, the non-inverting input of differential amplifier 13 is connected to the tap of a voltage divider comprising resistors 17 and 18, which voltage divider is connected between the source of positive potential +V and source of negative potential −V.

The values of resistors 15 and 16 are such that the DC potential at the inverting input of differential amplifier 12 is a predetermined amount more negative than potential +V. Similarly the values of resistors 17 and 18 are such that the potential at the non-inverting input of differential amplifier 13 is slightly more positive than the negative potential −V.

The output terminals of each of the differential amplifiers 12 and 13 are connected to the inputs of three state gates 19 and 20 which also have individual enable inputs 21 and 22. The output of gates 19 and 20 are connected to conductors which are part of the data bus connected to the control microprocessor for the PBX.

Also connected to the data bus are leads designated "Read," "Chip Select," clock 02 which are connected as inputs to AND gate 23. The output of gate 23 is connected to the enable inputs 21 and 22 of gates 19 and 20.

The combination of each 8a, 8b and 8c crosspoint switch array with its corresponding control is preferably integrated circuit type MT8004B, which is available from Mitel Corporation, P.O. Box 13089, Kanata, Ottawa, Ontario, Canada. This integrated circuit contains all of the CMOS crosspoints required in a 4 by 8 conductor matrix, along with a memory and an address decoder for controlling the crosspoints directly from the address and data buses from the PABX microprocessor.

In operation, it will be assumed that a talking path is to be set up between a pair of line circuits. This is initiated when one of the subscribers goes off hook. The microprocessor is apprised of this through means which does not form part of this invention. Since the microprocessor has stored the information of which junctors are idle and which are busy, an idle junctor is selected.

The address and instruction on the address and data bus from the central processing unit is applied to control circuitry 9a, 9b and 9c, which closes the CMOS crosspoint switch within crosspoint matrix 8a, 8b and 8c, connecting the voltage level checking circuit to the selected idle junctor which is intended to be used to interconnect the pair of line circuits.

Since the voltage checking circuit is now connected to the junctor, which is at this point not connected to any column conductor within crosspoint matrix 2a, 2b and 2c, 3a 3b and 3c, etc the source of potential +V is applied through resistor 14 to the junctor.

Once the junctor has been connected through matrix 8a, 8b and 8c to the voltage level sensing circuit, a read pulse is applied by the microprocessor to the appropriate input of AND gate 23 and to the appropriate clock lead with a pulse on the 02 lead, as well as a chip select pulse on the CSEL input of AND gate 23. The output of gate 23 is applied to both the enable inputs 21 and 22 of gates 19 and 20, to allow the output level of amplifiers 12 and 13 to be read to the microprocessor data bus.

If the junctor is not faulty, the voltage which appears at the non-inverting input of amplifier 12 exceeds the threshold level set by the voltage tap at the inverting input, and an output signal appears from differential amplifier 12. Yet none will appear at the output of differential amplifier 13. The output signal from differential amplifier 12 passes through enabled gate 19 and is applied to the microprocessor data bus. This indicates to the microprocessor that the junctor is idle and unfaulted. The microprocessor is thus advised that the line conductor can be connected to the junctor within one of the crosspoint matrices. On the other hand, had a faulty or incorrect junctor been selected, one, for instance, which had already been connected to a line circuit, the low impedance of the line circuit to ground causes the DC voltage level of the junctor to be at nearly ground potential. In this case the potential sensed by the level sensing circuit is lower than the threshold of differential amplifier 12 and higher than the threshold of differential amplifier 13. The output signals of gates 19 and 20 are thus at their intermediate level. Since the microprocessor had expected this time to receive a high level indication only from gate 19, it recognizes that the junctor check has established that the junctor may not be used for the present call. Accordingly an alternate idle junctor is selected and the voltage level sensing circuit is connected to the alternate idle junctor for further checking.

Assuming that the first junctor has checked satisfactorily with the sensing of the presence of a high level signal output from gate 19, the microprocessor proceeds to connect the line circuit requesting service to the junctor by control of the crosspoint within the appropriate crosspoint matrix 2a, 2b, and 2c or 3a, 3b, and 3c, etc. When this occurs, the low impedance path in the line circuit interfacing the crosspoint matrix immediately drops the voltage level on the junctor to nearly ground or common potential. Since this potential is below the threshold of operational amplifier 12 and above the threshold of operational amplifier 13, the output signals of both gates 19 and 20 are at intermediate level. Since this is the level expected by the microprocessor upon connection of the line circuit, it thus establishes that the junctor and the line circuit output are not faulty.

It was noted that electronic crosspoints are typically CMOS switches or other solid state devices. Such crosspoints usually operate from positive and negative sources of supply. A fault in the crosspoint switch itself has been found typically to drop the voltage to nearly the negative supply potential, or to raise it to nearly the positive supply potential. In case the level is dropped to nearly the negative supply potential, the output of operational amplifier 13 switches from a low to a high level positive state, resulting in a high level output signal from gate 20. On the other hand in the event that the junctor voltage has been raised to a level nearly at the positive supply potential, a high level output is produced at the output of differential amplifier 12 rather than amplifier 13, resulting in a high level output from gate 19, rather than from 20. Since the microprocessor at this point expects only intermediate level signals at the data bus leads which are at the outputs of gates 19 and 20, it recognizes that the crosspoint switch is faulty, or that it did not close the talking path to the junctor (the latter case retaining the high level positive voltage on the junctor). In this case, another idle junctor is selected and the voltage level sensing circuit is connected to the newly selected junctor in place of the one displaying the fault.

Assuming that the junctor has tested to the correct voltage, the microprocessor causes the crosspoint in crosspoint matrix 8a, 8b and 8c to open by passing the appropriate information into control circuit 9a, 9b and 9c, which effectively removes the voltage level sensing circuit from the junctor which was tested. The microprocessor then connects a digit receiver to the junctor or otherwise stores digits to be dialed by a subscriber having his telephone set connected to the line which is connected in the crosspoint matrix to the just-tested junctor. The called line circuit is then connected via the same or a newly tested junctor to the calling line circuit.

Once the called line circuit has been connected to the junctor, the junctor is connected to the above described sensing circuit within crosspoint matrix 8a, 8b and 8c as before. Again the sensing circuit checks the voltage level of the junctor. Assuming that the central voltage range below the threshold of differential amplifier 12 and above the threshold of differential amplifier 13 is sensed, the checking circuit is disengaged by opening the crosspoint in crosspoint matrix 8a, 8b and 8c. However if a voltage is sensed which is more negative than the threshold of differential amplifier 13, the microprocessor registers a fault. However in this case it is preferred that the junctor not be disengaged, but that the talking path be maintained.

As noted earlier, it is preferred that if the junctor voltage check shows a fault prior to dialing by the calling subscriber of the called party, a new idle junctor should be selected and further checked. However if the junctor has been found to be not faulty prior to connection of the called party's line circuit or trunk, merely a fault indication should be provided to an operator under control of the microprocessor.

As an example of useful parameters of the circuit, +V preferably is +8 volts, and −V is −5 volts. Resistors 15 and 16 typically are 1 K and 11 K ohms respectively, and resistors 17 and 18 are typically 11 K and 1 K ohms respectively. Accordingly differential amplifier 12 provides an output signal in the event the voltage level sensed on the junctor is above a +2 volt threshold, and differential amplifier 13 provides an output signal in the event the voltage level on the junctor is more negative than a −2 volt threshold.

Accordingly a no fault condition on the junctor connected to the line circuit is obtained over a junctor voltage range of 4 volts, from −2 to +2 volts with reference to common or ground potential. Variations in the junctor voltage due to variations in line or trunk circuit impedance can thus be tolerated.

It should be noted that other voltage ranges can be used upon the discretion of the designer, and depending on what the normal DC operating voltage level is on the junctor.

The present circuit thus provides an indication to the microprocessor as to the state of the junctor before a fault condition affects the reliability of a talking path to be connected therethrough.

It may now become evident to a person skilled in the art that this circuit can be used in environments other than the specific PABX described, and to check circuits other than the specific junctors described. Further, other variations or embodiments may be designed by a person skilled in the art understanding this invention. All are considered within this sphere and scope of the invention is defined in the appended claims.

The embodiments of the invention in which an exclusive property or privilege is requested are defined as:

1. A junctor checking system comprising:
 (a) a first junctor for connection to a line circuit which has a low impedance to a common potential,
 (b) a voltage level sensing circuit,
 (c) means for connecting the voltage level sensing circuit to the junctor,
 (d) a resistor connecting the input of the voltage level sensing circuit to a voltage source, and
 (e) means for connecting the voltage level sensing circuit to a further idle junctor in the event the voltage level sensed by the sensing circuit after connection to the first junctor is closer to common potential than to the potential level of the voltage source.

2. A junctor checking system as defined in claim 1 further comprising means for connecting the voltage level sensing circuit to the further idle junctor in the event the voltage level sensed by the sensing circuit after connection of the first junctor to the line circuit is higher or lower than a predetermined range which includes common potential.

3. A junctor checking system as defined in claim 2, in which the voltage level checking circuit is comprised of a pair of differential amplifiers biased to provide an upper and a lower threshold level for defining said predeterminal range.

4. A junctor checking system as defined in claim 3 including central processing unit means connected to the output of the voltage level checking circuit for causing disconnection of the voltage level checking circuit from the first junctor, selection of the further idle junctor and reconnection of said checking circuit to said further idle junctor in the event the voltage level detected is within said predetermined range prior to connection of the junctor to the line circuit and in the event the voltage level sensed by the sensing circuit after connection of the junctor to the line circuit is higher or lower than the predetermined range which includes common potential.

5. A junctor checking circuit as defined in claim 3 or 4 in which said voltage source is a source of positive potential.

6. A junctor checking system as defined in claim 3 or 4, in which the pair of differential amplifiers is comprised of a first differential amplifier having its non-inverting input connected through the resistor to a source of positive potential, and its inverting input connected to the tap of a voltage divider which is connected between the terminals of a source of positive and negative potential whereby the tap provides a potential level at the inverting input of a first predetermined percentage lower than the positive source of potential;

and is further comprised of a second differential amplifier having its inverting input connected to the non-inverting input of the first differential amplifier, and its non-inverting input connected to the tap of a second voltage divider which is connected between the terminals of a source of positive and negative potential whereby the tap provides a potential level at the non-inverting input of the second differential amplifier of a second predetermined percentage higher than the negative potential, whereby an output signal of the first differential amplifier is produced upon a junctor voltage level at its non-inverting input being higher than the voltage level at its inverting input and an output signal of the second differential amplifier is produced upon a junctor voltage level at its non-inverting input being lower than the voltage level at its inverting input.

7. A junctor checking system as defined in claim 2, in which the voltage level sensing circuit is comprised of a first and second differential amplifier, the non-inverting inputs of both said amplifiers being connected through the resistor to a positive voltage source, the inverting input of the first differential amplifier being connected to a second source of potential lower than the potential of the positive voltage source, the inverting input of the second differential amplifier being connected to a third source of potential lower than said common potential, whereby an output of the first differential amplifier is produced upon the junctor voltage when applied to the non-inverting inputs being higher than the second source of potential and an output of the second differential amplifier is produced upon the junctor voltage, when applied to the non-inverting inputs, being lower than the third source of potential.

8. A junctor checking system as defined in claim 7, in which the output of each of the differential amplifiers is connected in a circuit path to a data bus for connection to a central processing unit junctor controller.

* * * * *